United States Patent [19]
Horn et al.

[11] Patent Number: 6,159,521
[45] Date of Patent: Dec. 12, 2000

[54] DENT CORN STARCH ENROBING SLURRY

[75] Inventors: Greg Horn, Littleton; Saul Rogols, Golden, both of Colo.

[73] Assignee: Penford Corporation, Bellevue, Wash.

[21] Appl. No.: 09/557,842

[22] Filed: Apr. 26, 2000

Related U.S. Application Data

[62] Division of application No. 09/108,607, Jul. 1, 1998, Pat. No. 6,080,434.

[51] Int. Cl.$^7$ .......................... A21D 10/04; A23L 1/0522
[52] U.S. Cl. .......................... 426/549; 426/550; 426/653; 426/661
[58] Field of Search ..................... 426/549, 550, 426/653, 661

[56] References Cited

U.S. PATENT DOCUMENTS

| | | | |
|---|---|---|---|
| 3,597,227 | 8/1971 | Murray et al. | |
| 3,751,268 | 8/1973 | Van Patten et al. | |
| 4,317,842 | 3/1982 | El-Hag et al. | 426/302 |
| 4,505,509 | 3/1985 | Bell et al. | 426/459 |
| 4,529,607 | 7/1985 | Lenchin et al. | 426/94 |
| 4,595,597 | 6/1986 | Lenchin et al. | 426/555 |
| 5,059,435 | 10/1991 | Sloan et al. | 426/102 |
| 5,141,759 | 8/1992 | Sloan et al. | 426/102 |
| 5,281,432 | 1/1994 | Zallie et al. | 426/549 |
| 5,302,410 | 4/1994 | Calder et al. | 426/637 |
| 5,393,552 | 2/1995 | Busacker et al. | 426/637 |
| 5,431,944 | 7/1995 | Melvej | 426/552 |
| 5,622,741 | 4/1997 | Stubbs et al. | 426/243 |
| 5,648,110 | 7/1997 | Wu et al. | 426/102 |
| 5,750,168 | 5/1998 | Woerman et al. | 426/102 |
| 5,897,898 | 4/1999 | Rogols et al. | 426/102 |

FOREIGN PATENT DOCUMENTS

WO85/01188  3/1985  WIPO.

*Primary Examiner*—Arthur L. Corbin
*Attorney, Agent, or Firm*—Marshall, O'Toole, Gerstein, Murray & Borun

[57] ABSTRACT

An aqueous starch enrobing slurry, for coating the outer surface of a potato product, having an as is solids content which is characterized by at least 30% by weight of a first crosslinked starch, at least 2% by weight of a crosslinked dent corn starch having a crosslinking level of at least 500 ppm and from 5% to 20% by weight dextrin, and wherein the crosslinked dent corn starch is preferably acetylated.

19 Claims, No Drawings

6,159,521

DENT CORN STARCH ENROBING SLURRY

This is a divisional of U.S. application Ser. No. 09/108,607, filed Jul. 1, 1998, now U.S. Pat. No. 6,080,434.

BACKGROUND OF THE INVENTION

The present invention relates generally to coated potato products and formulations for coating potato products such as frozen french fries.

Methods for preparing and applying coatings to the outer surfaces of frozen potato products are well known in the art. Murray et al. U.S. Pat. No. 3,597,227 disclose a process in which raw potato strips are coated in a hot aqueous solution of modified gelatinized amylose derived from corn or potato starch. The process is said to produce a finished product which has superior strength and rigidity. Van Patten et al., U.S. Pat. No. 3,751,268 disclose the coating of blanched potato pieces with an ungelatinized unmodified high amylose starch having an amylose content of at least 50 percent. The coated potato strips are deep fat fried during which the starch in the coating is gelatinized.

El-Hag et al. U.S. Pat. No. 4,317,842 discloses the process of dipping blanched potato strips in an aqueous ungelatinized starch slurry to coat the strips, which are next soaked in hot oil to gelatinize the starch in the coating. The strips are then parfried and frozen. The strips may be reheated for consumption by heating in an oven rather than by deep fat frying.

Lenchin et al., WO 85/01188 disclose batters comprising the flour of high amylose corn hybrids for producing microwaveable pre-fried foodstuffs. The use of flours of high amylose corn hybrids is said to provide pre-fried foodstuffs with improved crispness after microwave cooking which otherwise tends to make such products soggy.

Bell et al., U.S. Pat. No. 4,504,509 disclose batter compositions for potato strips comprising crosslinked high amylose corn starch (Hylon® VII, National Starch and Chemical Corp.) in combination with tapioca dextrin. Lenchin et al., U.S. Patent Nos. 4,595,597 and 4,529,607 and Zallie et al., U.S. Pat. No. 5,281,432 also disclose the use of high amylose corn starch or acetylated high amylose corn starch in french fry enrobing slurries. While high amylose corn starches can provide certain useful properties to french fry enrobing slurries their practical utility is limited by their expense.

Sloan et al., U.S. Pat. Nos. 5,059,435 and 5,141,759 disclose a process for preparing frozen coated potatoes wherein raw potatoes are washed, cut, blanched and partially dehydrated. The cut potatoes are then coated with an aqueous starch slurry comprising 15 to 35% by weight modified ungelatinized potato starch, 2 to 10% by weight modified ungelatinized corn starch, 2 to 10% by weight rice flour and other optional ingredients. The coated potato strips are parfried in oil and then frozen. The frozen strips are prepared for consumption by either finish frying in hot oil, or heating in an oven. The starch coating is said to enhance the holding quality of the ready to consume product and to improve the acceptability of the finished product by increasing the crispness of the outer surface, and helping to maintain the tenderness of the interior of the cut potato. In particular, the potato starch and corn starch are each said to contribute crispness to the coating, and because they are not gelatinized prior to the parfrying step they decrease clumping of the strips during processing. The rice flour is said to provide a desirable tenderness in the finished product.

The Sloan patents teach the use of potato starches which have been modified through known chemical cross-linking processes in order to minimize sticking or clumping of the strips during processing, and coat the potato strips evenly. The Sloan patents disclose as preferred an ungelatinized chemically modified potato starch (K-1010, Penford Corporation, Richland, Wash.) which is crosslinked with phosphorus oxychloride ($POCl_3$) at an effective level of 980 ppm. (This starch is characterized by a Brabender Amylograph viscosity of 50–100 BU ("Brabender units") when measured at a 9% starch solids concentration for 15 minutes at 95° C.) A chemically modified ungelatinized cornstarch said to be preferred for use in conjunction with the above modified potato starch is said to be Flojel® 60 (National Starch and Chemical Corp., Bridgewater, N.J.) which is said to contribute crispness to the coating and to produce an optimal result when present in the coating slurry at a concentration of between two and ten percent by weight.

Also of interest to the present application is the disclosure of Wu, et al. U.S. Pat. No. 5,648,110 which discloses use of potato starches with crosslinking levels which are generally higher than 550 ppm as preferred components of starch enrobing slurries. Further of interest is the disclosure of Woerman, et al. U.S. Pat. No. 5,750,168 which discloses preferred starch enrobing slurries containing crosslinked tapioca starches in combination with tapioca dextrins and high amylose corn starch.

References relating to use of starch hydrolysis products include Calder et al., U.S. Pat. No. 5,302,410 and Brusacker et al., U.S. Pat. No. 5,393,552 which teach the use of hydrolyzed starch products such as dextrins and maltodextrins as components of aqueous enrobing slurries. Specifically, the patents disclose contacting blanched potato strips with an aqueous solution which contains from 3% to 12% by weight of a hydrolyzed starch product characterized by a DE less than 12 and preferably from about 2 to 10. The patents specifically disclose the use of maltodextrins having a DE of 6 and teach against the use of maltodextrins having DE values greater than 12 because such hydrolyzate products build up reducing sugars and promote undesirable browning of the final product. The patents further teach that concentrations of the starch hydrolyzate products greater than 12% are undesirable because "at higher concentrations the surface of the potato strips become slightly tacky upon finish frying which promotes undesirable clumping of the potato strips."

Of further interest to the present invention is the disclosure (hereby incorporated by reference) of co-owned U.S. Pat. No. 5,897,898, which is directed to the finding that unexpected crispness can be obtained in a french fry coating composition by utilizing at least 40% by weight (on an as is solids basis) of a hydrolyzed starch characterized by a DE of from 0.2 to 0.8. This was particularly surprising in light of the teachings of Calder et al., U.S. Pat. No. 5,302,410; and Brusacker et al., U.S. Pat. No. 5,393,552 as discussed above.

Of further interest to the present invention is the disclosure of Melvej, U.S. Pat. No. 5,431,944 which discloses a dry batter mix for french fries comprising from about 1.5% to about 9% by weight of a leavening agent and from about 5% to about 40% by weight of a starch blend comprising a high amylose starch, a starch, from about 1% to about 8% by weight dextrin wherein the weight percent in the batter mix is inversely related to the weight percent of the leavening agent, and about 0.1% to about 2% of a food gum. The specification teaches that the batter mix preferably includes about 2% to about 6%, by weight of dextrin and that the dextrin "provides a tender bite and in improved mouthfeel to the reconstituted food product." The patent further teaches that "[t]he particular amount of dextrin included in the batter mix is inversely related to the amount of leavening agent present in the batter mix. Therefore, as the amount of leavening agent in the batter is increased, the amount of dextrin in the batter mix is decreased, and vice versa. The dextrin mitigates the effects of the leavening agent and provides a more tender crispness. However, if too much dextrin is included in the batter mix, the reconstituted food product has a greasy mouthfeel." (Col. 7, lines 18–30).

Stubbs et al., U.S. Pat. No. 5,622,741 disclose starch enrobing slurries for potato products comprising the combination of corn flour, dextrins and dent corn starch wherein the dextrins are utilized as fillers. With its emphasis on corn flour the disclosure narrowly defines the modifications that may be made in the enrobing slurry ingredients.

Accordingly, there remains a desire in the art to provide further improvements in the use of dextrin containing enrobing slurries and further to provide improved properties of smoothness, crispness and extended hold time to enrobing slurries. Additionally, there remains a desire in the art to improve or maintain the properties of enrobing slurries while minimizing or eliminating the use of high amylose corn starch.

SUMMARY OF THE INVENTION

The present invention is directed to coating formulations which provide improved functionality to french fry (potato strip) products. As one aspect of the invention, it has been found that highly crosslinked dent (not high amylose) corn starch generally and acetylated crosslinked dent corn starch in particular provides improved functionality to french fry coating formulations and can be used to replace the presence of more expensive high amylose corn starch in a wide variety of french fry coating formulations. As a further aspect of the present invention it has been found that crosslinked corn starches generally and crosslinked acetylated corn starches specifically are particularly useful for enhancing the functionality of dextrins. In particular, the combination of acetylated crosslinked corn starches into a formulation comprising a first crosslinked starch (such as a potato starch) and a dextrin provides improved crispness to the french fry products coated with that formulation.

Specifically, the invention provides a starch enrobing slurry for coating the outer surface of a potato product and methods for preparing same the slurries having an as is solids content comprising: at least 30% by weight of a first crosslinked starch and at least 2% by weight of a crosslinked dent corn starch characterized by a crosslinking level of at least 500 ppm and a low soluble dextrin at from 5% to 20% by weight with a preferred dextrin as is solids content ranging from 8% to 16% by weight. The crosslinked dent corn starch is preferably present at a dry solids content of from 4% to 12% by weight and is preferably crosslinked at a level of greater than 900 ppm. Most preferably the crosslinked dent corn starch is acetylated. The first crosslinked starch may be selected from the group consisting of potato and tapioca starches but is preferably a crosslinked potato starch. According to a preferred aspect of the invention the crosslinked potato starch is characterized by a crosslinking level of less than 750 ppm and more preferably by a crosslinking level of from 200 ppm to 700 ppm with a crosslinking level of less than 550 ppm and from 300 ppm to 675 ppm being particularly preferred. When the crosslinked potato starch is characterized by a crosslinking level of less than 750 ppm the crosslinked corn starch is preferably characterized by a crosslinking level of equal to or greater than 900 ppm. The first crosslinked starch is more preferably present at a dry solids content of at least 48% by weight.

According to a further aspect of the invention, it has been found that highly crosslinked dent corn starches generally and highly crosslinked acetylated dent corn starches in particular can be used to substitute for the use of some or all of high amylose corn starches in french fry formulations. According to this aspect of the invention, it is believed that the high gelatinization temperature of the highly crosslinked dent corn starch and not the amylose content provides the critical improved functional characteristic of this ingredient. Thus, the present invention further provides an aqueous starch enrobing slurry for coating the outer surface of a potato product having an as is solids content comprising: at least 30% by weight of a first crosslinked starch (which is preferably crosslinked potato or tapioca starch) and at least 2% (although preferably 4–12% by weight) by weight of a crosslinked dent corn starch characterized by a crosslinking level of at least 500 ppm with higher crosslinking levels being even more preferred. The crosslinked corn starches of the invention are preferably acetylated, characterized by a crosslinking level of greater than 900 ppm and are preferably present at a dry solids content of from 4% to 20% by weight. The crosslinked first starch is preferably crosslinked potato starch. The use of highly crosslinked dent corn starches allows improvements in french fry products comprising potato starches having lower crosslinking levels than would ordinarily provide optimum properties. Lower crosslinked potato starches are known to exhibit a rougher surface on the coated potato strip and pick up more frying oil. Thus, potato starches having crosslinking levels of less than 750 ppm to as low as 200 ppm provide improved coating properties when combined with the highly crosslinked dent corn starch. While the starches can be crosslinked according to any of a variety of methods known to the art, starches crosslinked with an agent selected from the group consisting of phosphorus oxychloride, sodium trimetaphosphate, adipic anhydride and epichlorohydrin are particularly preferred.

The invention further provides processes for preparing a frozen potato product with a film-like coating on the outer surface and the "french fry" products made thereby, which process comprises: cutting the raw potatoes; blanching the raw potatoes; partially drying the blanched potatoes; coating the partially dried potatoes with an aqueous starch slurries according to the invention; and freezing the coated potatoes. According to alternative embodiments such processes may be carried out which further comprise the step of parfrying the coated potatoes prior to freezing.

While the aqueous starch enrobing slurries of the invention may include a variety of additional ingredients particularly preferred slurries are characterized by an as is solids content comprising from 5% to 45% by weight and higher rice flour with rice flour concentrations ranging from 10% to 25% by weight rice flour being preferred.

The present invention provides improved aqueous starch enrobing slurries which provide improved flavor, crispness and other physical properties to coated potato products such as french fries. As one aspect of the present invention, starch enrobing slurries have been found that provide various improved properties to the resulting french fries which they are used to encoat.

DETAILED DESCRIPTION

Processes for the production of frozen french fries are well known and include the basic steps of preparing raw potatoes by washing, peeling and cutting into appropriately shaped pieces. The resulting potato strips are then blanched according to conventional methods in order to inactivate enzymes in the potato and to leach sugars from the surface of the potato strip. According to one preferred method, the blanched potato strips are treated in a brine solution comprising components such as sodium chloride, dextrose and other ingredients known to the art. After these steps, the potato strips are then subjected to a drying step to reduce the moisture present in the strips.

The strips are then coated with the aqueous starch enrobing slurry of the invention. After blending of the solid ingredients with a desired amount of water to produce the french fry batter, the batter may be applied to coat the cut potato strips at a batter pickup of from about 8% to about 30% with a pickup of from 13% to about 18% being preferred and a coating pickup of about 15% being particularly preferred, (based on coated potato strips weight).

After coating with the coating composition, the potato strips are drained and parfried at a temperature of from about 360° F. to about 390° F. for a time period of from 40 seconds to about 90 seconds. Parfrying serves to gelatinize the starch of the potato strips and of the coating and removes moisture from the inside of the potato strip.

The potato strips are then frozen, packaged and preferably stored at a temperature below 0° F. until they are prepared for final consumption. In order to prepare the potato strips for consumption, they are cooked either by finish frying or by baking in an oven. After such preparation, potato strips prepared according to the invention are characterized by a crisp outer layer, a moist tender interior and improved flavor qualities compared to those prepared with coating compositions comprising corn starch components.

Minor amounts of modified pregelled potato starches may be used in the compositions of the invention to provide viscosity control and suspension of the solids in the batter. Specifically, preferred aqueous slurries may have an as is solids content of up to about 5% by weight of an unmodified pregelled potato starch for viscosity control. One preferred modified pregelled potato starch used as a viscosifier for such use is available commercially as PenPlus® 40 (213 ppm crosslinked) (Penford Food Ingredients Co., Englewood, Colo.) which can be incorporated into the batter composition at preferred solids concentrations of 1% to 5% by weight.

In addition, it has been found that the viscosity of the crosslinked starches may influence the overall qualities of the coated french fries. While the viscosities of crosslinked starches are generally controlled by the degree to which the starch is crosslinked it is believed that other factors, such as heat annealing may reduce viscosity and increase gelatinization temperatures and can affect the actual viscosity when used according to the invention and measured according to procedure set out below.

The modified starches used in practice of the invention are crosslinked with any of a variety of agents according to methods well known to the art but are preferably crosslinked with phosphorus oxychloride under alkaline conditions. As used herein crosslinking levels refer to levels of crosslinking using phosphorus oxychloride according to conventional methods and its equivalent using other crosslinking agents. Sodium trimetaphosphate is useful for crosslinking as is phosphorus oxychloride. Adipic anhydride is also useful as a crosslinking agent but reacts even more slowly than does sodium trimetaphosphate. Less preferably, epichlorhydrin may also be used at equivalent levels of crosslinking.

Different starches having different levels of crosslinking, and thus exhibiting different viscosities, may be used together in practice of the invention. For example, one modified starch having a crosslinking level of 300 ppm and characterized by a relatively high viscosity may be used in conjunction with another modified starch having a crosslinking level of 1000 ppm and characterized by a relatively low viscosity to yield a blend of modified starches characterized by a crosslinking level and having a viscosity intermediate between those of the two components.

The method for determining the viscosity of crosslinked starches for use according to the invention utilizes a Brabender Amylograph viscometer according to conventional methods known to the art as set out below. Specifically, 45.0 grams of "dry basis" starch (to yield 13.5% solids) is placed in a beaker to which distilled water is added to make up 450 grams and is mixed thoroughly with a magnetic stirring bar. The pH of the mixture is adjusted to 7.0 with dilute (approximately 0.5%) NaOH or dilute (approx. 0.5%) HCl. The pH should be determined over a period of 5 to 10 minutes and should be measured both before and after the viscometer run. The starch slurry is then added to the viscometer bowl and the beaker rinsed with distilled water to give a total starch and water weight of 500 grams. The Brabender Amylograph is then run on program 2 comprising a starting temperature of 25° C., a heating rate of 1.5° C./minute to 95° C., running at 95° C. for 15 minutes wherein the measurement is taken at the conclusion of 15 minutes in Brabender units (BU), and cooling at 1.5° C./minute to 50° C. Those of skill in the art will recognize that operating the viscometer at alternative conditions will achieve differing results.

The starches of the invention may also be further modified by acetylation or hydroxypropylation but such modification is not necessary for practice of the invention. If the starches are so modified, it is generally necessary to increase the level of crosslinking in order to obtain an equivalent level of viscosity.

The starch enrobing slurries of the invention can optionally comprise a rice flour component at a solids concentration of from about 5% to about 45% (or even as high as 82% according to co-owned U.S. Pat. No. 6,022,569, the disclosure of which is incorporated by reference herein) by weight with concentrations of from about 10% to about 25% by weight (as is solids basis) being preferred. Rice flours suitable for use with the invention include long grain, medium grain or waxy rice with long grain rice flour being preferred. Long grain rice provides the best results for crispness, because of its higher amylose content in the starch. Use of medium grain rice flour tends to give a tough bite to the batter coating and waxy rice flour provides a hard crunch immediately after frying but the batter coating becomes soft and chewy within ten minutes after frying.

A variety of other flours and starches may optionally be used in producing the coating formulations of the invention including but not limited to potato starch, potato flour, wheat flour, wheat starch, oat flour, oat starch, corn flour and corn starch. Such starches may be crosslinked and/or substituted such as by acetylation or other means.

Optional minor ingredients for use in providing the coating compositions of the invention include maltodextrins, dextrins, microcrystalline cellulose, and hydrocolloids including hydroxypropyl methyl cellulose, and gums including xanthan gum, guar gum and the like which are used to provide improved structure and keeping qualities to the coated french fry products. Maltodextrins are preferably used at solids concentrations of up to 4%. Maltodextrins useful with the invention may be derived from any type of starch including tapioca, potato and corn starch and include those characterized by having a DE in the range from 0.2 to 5 with maltodextrins having a DE of less than 2 being preferred as described in co-owned U.S. Pat. No. 5,897,898.

Dextrins obtained from a variety of sources, such as potato, corn and tapioca, may also be used according to the invention with potato dextrins being preferred. Suitable tapioca dextrins that may be used according to the invention include those commercially available as Crisp Coat® and Crisp Coat UC® (National Starch and Chemical Co.) which comprise tapioca dextrin alone or in combination with high amylose corn starch.

Preferred gum blends comprise approximately 10% gum by weight and are preferably incorporated into the compositions of the invention at solids concentrations of less than 0.1% gum by weight.

Leavening agents in the form of baking powders may also be incorporated into the compositions of the invention in order to open up the structure of the coating batters upon cooking and release moisture from the french fry products without blowing off the coating layer. Suitable baking powders include sodium bicarbonate plus one or more leavening acids such as those in the group consisting of sodium aluminum phosphate (SALP), sodium aluminum sulfate (SAS), sodium acid pyrophosphate (SAPP), dicalcium phosphate (DCP), and anhydrous monocalcium phosphate (AMCP). The combination of sodium bicarbonate and SAPP is preferred. Such leavening agents are preferably added at sodium bicarbonate concentrations of about 0.9 parts soda to 1.1 parts SAPP.

Additional ingredients include protein components such as sodium caseinate, nonfat dry milk, soy, whey, dried egg whites. Such proteins interact with the carbohydrates in the coating compositions to increase film strength, provide structure, improve crispness and prolong holding of crispness. Other ingredients include carbohydrate components such as methyl cellulose, hydroxypropyl methyl cellulose, microcrystalline cellulose and the like. Still other optional ingredients may also be incorporated into the coating formulations of the invention including salt, flavorings, seasonings and coloring agents such as whey or dextrose.

The french fry coating composition is prepared by dry blending of the various solid ingredients. Water is then slowly added to the dry ingredients in an amount selected to provide an appropriate viscosity to the coating batter. It has been found that aqueous slurries containing from about 150 parts to about 300 parts by weight water to 100 parts by weight of the solid ingredients are characterized by a preferred viscosity for coating of the potato strips. The ungelatinized starches do not substantially contribute to the viscosity of the solution.

The crispness of the batter coated french fries is determined by several factors including the cook-out of the starch, the moisture balance between the batter coating surface and inside of the fries, the thickness of the coating layer, and the interaction of ingredients in the coating formulation. These effects are best demonstrated on best quality potatoes. The coating forms a discontinuous film which lets the moisture from the inside of the fries escape or vent out, but will not absorb significant amounts of moisture into the coating layer. Controlling moisture migration is important to maintaining the crispness of the fries under a heat lamp. The coating should preferably be somewhat brittle, which gives a clean bite with minimum toughness. There is a fine balance between all the ingredients in the batter formula to achieve crispness and keeping quality with the method used to process the potato strips contributing to the crispness of the french fries. It is further contemplated that the improved properties provided by the solids making up the starch enrobing slurries of the invention may also be provided when the solids ingredients making up the slurries are applied to potato products in a non-slurry form such as by dusting.

Other aspects and advantages of the present invention will be understood upon consideration of the following illustrative and comparative examples.

EXAMPLE 1

According to this example, acetylated and non-acetylated corn starches characterized by various levels of crosslinking were used to replace high amylose corn starch in a standard french fry coating formulation. In the formulation set out in Table 1-1 a 70% high amylose crosslinked corn starch (Hylon® VII, National Starch and Chemical) is used to promote crispness primarily with an added improvement in smoothness in the formulation. Table 1-2 shows the substitution of various other corn starches for the high amylose corn starch as the "test starch ingredient" in Table 1-1.

According to the method of this example, Russet-Burbank potatoes were peeled, cut into 9/32 inch strips and immersed and blanched in hot water for 6 minutes at 165° F. After blanching, the potato strips were immersed for 45 seconds in an aqueous solution comprising 2.4% salt and 0.2% SAPP based on total weight of water which was held at a temperature of 160°–170° F. After removal, the strips were drained and then dried in a conventional forced air oven dryer at 180° F. for a sufficient length of time (about 3 minutes) to effectuate a 12 to 14 percent water loss.

The components of Table 1-1 were dry blended and were hydrated at 40% solids by weight to produce a starch slurry and left to stand for at least 5 minutes before use. The potato strips were then dipped in the starch slurries. The potato strips were then drained for 60 seconds to remove excess slurry and to achieve a slurry coating pickup of 20% based upon original (as is) strip weight. The potato strips were then immediately parfried for 40 seconds at 360° F. The potato strips were then frozen and held overnight before being finished fried and evaluated for crispness and initial smoothness with the results are reported in Table 1-2 with the crispness results measured on a scale of 0–6.0 with 0 being least crisp and 6.0 being most crisp. Smoothness was evaluated on a scale of 0–6.0 with 0 being very rough and 6 being very smooth. The minimum acceptable score for crispness was about 4.0. The results as presented in Table 1-2 show that the products are characterized by high levels of crispness measured on a scale of 0–6.0 with 0 being least crisp and 6.0 being most crisp. The minimum acceptable score for crispness was about 3.0 to 3.5. The resulting products were then tested to evaluate their properties and the time period for which they maintained their crispness.

The results reported in Table 1-2 show that a low swelling starch (in this case the crosslinked dent corn having crosslinking levels greater than about 500 ppm, e.g. Exp. 1H-Exp 1N) may be used to replace high amylose corn starch in french fry coating formulations and in particular that the substitution of highly crosslinked acetylated dent corn starch for high amylose corn starch provides improved crispness and initial smoothness properties to the resulting french fries. Superior crispness is apparent for a 20 minute holding time along with obtaining a smooth finish to the final french fry product.

TABLE 1-1

| Ingredients | % |
| --- | --- |
| XL potato starch (650 ppm)[1] | 54.0 |
| Rice flour - 80 Mesh | 21.0 |
| Xanthan gum | 0.1 |
| Salt | 3.0 |
| SAPP #4 | 1.0 |
| Soda | 0.8 |
| 5DE Maltodextrins | 0.1 |
| Potato Dextrin (15–20% soluble) | 14.0 |
| Test Starch Ingredient | 6.0 |
|  | 100.0 |

[1]Potato starch crosslinked using 650 ppm phosphorus oxychloride according to conventional methods (Penbind 170, Penford Food Ingredients Co.).

TABLE 1-2

| Exp. | Test Starch | Crispness 5 min | 10 min | 15 min | 20 min | Initial Smoothness |
| --- | --- | --- | --- | --- | --- | --- |
| 1A | High Amylose Corn (Hylon VII) | 5.5 | 5.5 | 5.0 | 4.9 | 4/3 |
| 1B | Uncrosslinked Dent Corn | 5.0 | 4.0 | 4.0 | 3.5 | 4 |
| 1C | Uncrosslinked Dent Corn | 5.0 | 4.5 | 4.0 | 3.0 | 3.5/4 |
| 1D | XL (150 ppm) Dent Corn | 5.5 | 5.0 | 4.0 | 3.5 | 4/3 |
| 1E | XL (150 ppm) Dent Corn | 5.5 | 5.0 | 4.5 | 4.5 | 4 |
| 1F | XL (300 ppm) Dent Corn | 5.5 | 5.0 | 4.5 | 3.5 | 4/3 |
| 1G | XL (300 ppm) Dent Corn | 5.5 | 5.5 | 5.0 | 4.5 | 4 |
| 1H | XL (550 ppm) Dent Corn | 5.5 | 5.5 | 5.5 | 5.5 | 5 |
| 1I | XL (550 ppm) Dent Corn | 5.5 | 5.0 | 5.0 | 5.0 | 4.8 |
| 1J | XL (980 ppm) Dent Corn | 5.5++ | 5.5++ | 5.5+ | 5.5+ | 6 |
| 1K | XL (980 ppm) Dent Corn | 5.5+ | 5.5+ | 5.5 | 5.5 | 5 |
| 1L | Acetylated (4%) XL (980 ppm) Potato | 5.5++ | 5.5++ | 5.5+ | 5.5+ | 6 |
| 1M | Acetylated (4%) XL (980 ppm) Potato | 5.5+ | 5.5+ | 5.5+ | 5.5+ | 6 |
| 1N | Acetylated (4%) XL (980 ppm) Corn | 5.5 | 5.5 | 5 | 4.5 | 4/3 |

EXAMPLE 2

According to this example, the method of example 1 is repeated wherein potato strip coating formulations are prepared comprising the components of Table 2-1 wherein the test ingredient is present at higher concentrations. The test results reported in Table 2-2 confirm that the crosslinked dent corn having crosslinking levels greater than about 500 ppm may be used to replace high amylose corn starch in french fry coating formulations and in particular that the substitution of highly crosslinked acetylated dent corn starch for high amylose corn starch provides improved crispness and initial smoothness properties to the resulting french fries.

TABLE 2-1

| Ingredients | % |
| --- | --- |
| XL potato starch (650 ppm) | 54.0 |
| Rice flour - 80 Mesh | 21.0 |
| Xanthan gum | 0.1 |
| Salt | 3.0 |
| SAPP #4 | 1.0 |
| Soda | 0.8 |
| 5DE Maltodextrins | 0.1 |
| Potato Dextrin (15–20% soluble) | 9.0 |
| Test Starch Ingredient | 11.0 |
|  | 100.0 |

TABLE 2-2

| Exp. | Test Starch | Crispness 5 min | 10 min | 15 min | 20 min | Initial Smoothness |
| --- | --- | --- | --- | --- | --- | --- |
| 2A | High Amylose (Hylon VII) | 5.5 | 5.5 | 5.0 | 5.0 | 5 |
| 2B | Uncrosslinked Dent Corn | 5.5 | 4.5 | 4.0 | 3.0 | 4 |
| 2C | XL (150 ppm) Dent Corn | 5.5 | 5.0 | 4.5 | 4.5 | 4 |
| 2D | Acetylated (5%) XL (150 ppm) Dent Corn | 5.5 | 5.0 | 4.5 | 4.0 | 4.8 |
| 2E | XL (300 ppm) Dent Corn | 5.5 | 5.5 | 5.0 | 4.5 | 4 |
| 2F | XL (550 ppm) Dent Corn | 5.5 | 5.5 | 5.0 | 5.0 | 4 |
| 2G | Acetylated (5%) XL (550 ppm) Dent Corn | 5.5 | 5.5 | 5.5 | 5.5 | 6+ |
| 2H | XL (980 ppm) Dent Corn | 5.5 | 5.5 | 5.5 | 5.5 | 5.5 |
| 2I | Acetylated (5%) XL (980 ppm) Dent Corn | 5.5 | 5.5 | 5.5 | 5.5 | 6 |

EXAMPLE 3

According to this example, crosslinked dent corn starch was used to enhance the properties of dextrins in french fry coating formulations. Specifically, enrobing slurries were prepared according to the method of example 1 using the formulations described in Table 3 below. French fries were then produced and evaluated as described above with the results reported in Table 3. These results show that crosslinked acetylated dent corn starch has the ability to enhance the crispness properties provided by dextrins. The results also show that highly crosslinked non-acetylated corn also has the ability to enhance the crispness properties of coated french fries. In addition, the results show that the combination of a low crosslinked (200 ppm) potato starch as a primary film forming starch with crosslinked corn starch as a secondary low gelling starch and a low solubility dextrin yields a smooth, crisp french fried potato product and that the use of the three components in combination provides improvements over the use of those ingredients individually and lowers the effective cross linking level required for the crosslinked potato starch as the primary starch.

TABLE 3

| Ingredients | 3A % | 3B % | 3C % | 3D % | 3E % | 3F % | 3G % | 3H % |
|---|---|---|---|---|---|---|---|---|
| 650 ppm XL potato | — | — | 48 | 46 | 46 | 46 | 46 | — |
| 200 ppm XL potato | 46.1 | 48 | — | — | — | — | — | 48 |
| Xanthan gum | 0.2 | 0.2 | 0.2 | 0.2 | 0.2 | 0.2 | 0.2 | 0.2 |
| Salt | 5 | 5 | 5 | 5 | 5 | 5 | 5 | 5 |
| SAPP #4 | 1.0 | 1.1 | 1.1 | 0.9 | 0.9 | 0.9 | 0.9 | 1.1 |
| Soda | 1.2 | 0.9 | 0.9 | 0.7 | 0.7 | 0.7 | 0.7 | 0.9 |
| Rice flour - 30 mesh | 25 | 24 | 24 | 24.5 | 24.5 | 24.5 | 24.5 | 24.5 |
| Potato dextrin | 15.5 | — | — | 11.9 | 11.9 | 11.9 | 21.5 | — |
| Tapioca dextrin | — | 12 | 12 | — | — | — | — | 20.8 |
| 990 ppm XL Acetylated (5%) Corn | 6.0 | 8.8 | — | 10.8 | — | — | — | — |
| 980 ppm XL corn | — | — | — | — | 10.8 | — | — | — |
| 300 ppm XL Corn | — | — | — | — | — | 10.8 | — | — |
| 908 ppm XL Acetylated (4%) Potato | — | — | 8.8 | — | — | — | — | — |
| Evaluation | | | | | | | | |
| Crispness | | | | | | | | |
| 5 min | 5.5 | 5.5+ | 5.5 | 5.5 | 5.5 | 5.5 | 5.0 | 5.0 |
| 10 min | 5.5 | 5.5+ | 5.0 | 5.5 | 5.5 | 4.5 | 5.0 | 5.0 |
| 15 min | 5.0 | 5.5+ | 4.5 | 5.5 | 5.3 | 4.5 | 4.0 | 4.5 |
| 20 min | 5.0 | 5.5+ | 4.5 | 5.5 | 5.3 | 4.2 | 4.0 | 4.5 |
| Initial Smoothness | 4.5 | 5.5 | 4.5 | 5.5 | 5.5 | 5.5 | 4.5 | 4.5 |

EXAMPLE 4

According to this example, crosslinked dent corn starches characterized by different levels of acetylation were tested as the secondary low swelling starch in french fry enrobing slurries to determine the optimum level of acetylation. Specifically, french fry enrobing slurries were prepared according to the method of Example 1 using the formulation of Table 4-1. The resulting slurries were used to coat french fry products which were then evaluated according to that example. The results reported in Table 4-2 show that optimum acetylation levels for this particular experiment range from 2% to 4% with 3–4% providing the best results.

TABLE 4-1

| Ingredients | % |
|---|---|
| XL (650 ppm) potato starch | 48 |
| XL (980 ppm) acetylated (x %) potato starch* | 8.8 |
| Xanthan gum | .2 |
| Salt | 5 |
| SAPP 4 | 1.1 |
| Soda | .9 |
| Rice flour - 80 mesh | 24 |
| Tapioca dextrin | 12 |

TABLE 4-2

| Sample | Acetylation (%) | Crispness 5 min | 10 min | 15 min | 20 min | Initial Smoothness out of Fryer |
|---|---|---|---|---|---|---|
| 4A | 1 | 5.5 | 4.5 | 4.0 | 3.8 | 4.5 |
| 4B | 2 | 5.5 | 5.5 | 5.5 | 5.0 | 6 |
| 4C | 3 | 5.5 | 5.5 | 5.5 | 5.5 | 6 |
| 4D | 4 | 5.5 | 5.5 | 5.5 | 5.5 | 6 |
| 4E | 5 | 5.5 | 5.0 | 4.5 | 4.5 | 5 |

EXAMPLE 5

According to this example, a comparison was made between various french fry enrobing formulations comprising various substitutions of crosslinked (650 ppm) potato starch, highly crosslinked (980 ppm) dent corn starch and low soluble dextrin into a basic french fry formulation having as its primary components unmodified potato starch and rice flour. Specifically, french fry enrobing slurries were prepared according to the methods of Example 1 using the formulations of Table 5. The resulting slurries were used to coat french fry products which were then evaluated according to the methods of that example. The results reported in Table 5 show that the combination of crosslinked potato starch as a primary film forming starch with highly crosslinked dent corn starch as a secondary low swelling starch and potato dextrin as a low soluble dextrin provide significantly improved crispness and smoothness results over the use of those three components individually or in other combinations.

TABLE 5

| Ingredients | 5A % | 5B % | 5C % | 5D % |
|---|---|---|---|---|
| 650 ppm XL Potato Starch | 46 | — | — | — |
| Rice Flour 80 Mesh | 24.5 | 24.5 | 24.5 | 24.5 |
| Xanthan Gum | 0.2 | 0.2 | 0.2 | 0.2 |
| Salt | 5 | 5 | 5 | 5 |
| SAPP #4 | 0.9 | 0.9 | 0.9 | 0.9 |
| Soda | 0.7 | 0.7 | 0.7 | 0.7 |
| 980 ppm XL Corn Starch | 10.8 | 10.8 | 10.8 | — |
| Potato Dextrin | 11.9 | 11.9 | 11.9 | — |
| Potato Starch, Unmodified | — | 46 | 56.8 | 68.7 |
| Total | 100 | 100 | 100 | 100 |
| Evaluation | | | | |
| Crispness | | | | |
| 5 min. | 5.5 | 4.0 | 3.0 | 3.0 |
| 10 min. | 5.5 | 3.0 | 3.0 | 3.0 |
| 15 min. | 5.5 | 2.5 | 2.0 | 2.0 |
| 20 min. | 5.5 | 2.5 | 1.5 | 1.0 |
| Initial Smoothness | 6.0 | 4.0 | 4.0 | 3.0 |

EXAMPLE 6

According to this example, an evaluation was made of two french fry enrobing formulations not within the scope of the invention comprising either unmodified potato starch or unmodified dent corn starch as their primary film forming starch. Specifically, french fry enrobing slurries were prepared according to the methods of Example 1 using the formulations of Table 6. The resulting slurries were used to coat french fry products which were then evaluated according to the methods of that example. The results reported in Table 6 when compared to those of the preceding examples show that the use of unmodified starches as the primary film forming starches without the presence of secondary low swelling starches such as highly crosslinked dent corn starch and low soluble dextrins provide poor properties to the resulting french fry products.

TABLE 6

| Ingredients | 6A % | 6B % |
|---|---|---|
| Unmodified Potato Starch | 70 | — |
| Unmodified Corn Starch | — | 70 |
| Rice Flour | 20.75 | 20.75 |
| Xanthan Gum | 0.5 | 0.5 |
| PenPlus 40 | 1.20 | 1.20 |
| Salt | 5.0 | 5.0 |
| SAPP #28 | 1.6 | 1.6 |
| Soda | 1.4 | 1.4 |
| Total | 100 | 100 |
| Evaluation Crispness | | |
| 5 min. | 5.0 | 4.0 |
| 10 min. | 4.5 | 4.0 |
| 15 min. | 3.0 | 3.0 |
| 20 min. | 1.5 | 2.0 |
| Initial Smoothness | 3.0 | 3.0 |

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. An aqueous starch enrobing slurry for coating the outer surface of a potato product having an as is solids content comprising:
at least 30% by weight of a first crosslinked starch, at least 2% by weight of a second crosslinked starch consisting of a crosslinked dent corn starch having a crosslinking level of at least 500 ppm and from 5% to 20% by weight dextrin.

2. The aqueous starch enrobing slurry of claim 1 wherein said crosslinked dent corn starch is acetylated.

3. The aqueous starch enrobing slurry of claim 2 wherein said acetylated corn starch has a crosslinking level of greater than 900 ppm.

4. The aqueous starch enrobing slurry of claim 1 wherein said first crosslinked starch is selected from the group consisting of potato and tapioca starches.

5. The aqueous starch enrobing slurry of claim 4 wherein said first crosslinked starch is a crosslinked potato starch.

6. The aqueous starch enrobing slurry of claim 5 wherein the crosslinked potato starch has a crosslinking level of less than 700 ppm.

7. The aqueous starch enrobing slurry of claim 6 wherein the crosslinked potato starch has a crosslinking level of less than 550 ppm.

8. The aqueous starch enrobing slurry of claim 7 wherein the crosslinked corn starch has a crosslinking level of greater than 900 ppm.

9. The aqueous starch enrobing slurry of claim 6 wherein the crosslinked potato starch has a crosslinking level of from 500 ppm to 675 ppm.

10. The aqueous starch enrobing slurry of claim 1 wherein said slurry comprises said first crosslinked starch at a dry solids content of at least 48% by weight.

11. The aqueous starch enrobing slurry of claim 1 wherein said slurry comprises dextrin at a dry solids content of from 8% to 16% by weight.

12. The aqueous starch enrobing slurry of claim 1 wherein said dextrin is potato dextrin.

13. The aqueous starch enrobing slurry of claim 1 wherein said slurry comprises crosslinked dent corn starch at a dry solids content of from 4% to 12% by weight.

14. An aqueous starch enrobing slurry for coating the outer surface of a potato product having an as is solids content comprising:
at least 30% by weight of a first crosslinked starch and at least 2% by weight of a second crosslinked starch consisting of a crosslinked dent corn starch having a crosslinking level of at least 500 ppm.

15. The aqueous starch enrobing slurry of claim 14 wherein said crosslinked dent corn starch has a crosslinking level of at least 900 ppm.

16. The aqueous starch enrobing slurry of claim 14 wherein said crosslinked dent corn starch is acetylated.

17. A process for preparing an aqueous starch enrobing slurry for coating the outer surface of a potato product which comprises:
forming an aqueous slurry having an as is solids content comprising at least 30% by weight of a first crosslinked starch, at least 2% by weight of a second crosslinked starch consisting of a crosslinked dent corn starch having a crosslinking level of at least 500 ppm and from 5% to 20% by weight dextrin.

18. The process of claim 17 wherein said dextrin is potato dextrin.

19. A process for preparing an aqueous starch enrobing slurry for coating the outer surface of a potato product which comprises:
forming an aqueous slurry having an as is solids content comprising at least 30% by weight of a first crosslinked starch and at least 2% by weight of a second crosslinked starch consisting of a crosslinked dent corn starch having a crosslinking level of at least 500 ppm.

* * * * *